3,682,717
TURBINE BLADE MATERIAL OF HIGH TENSILE STRENGTH, HIGH DAMPING CAPACITY AND HIGH DUCTILITY
Ryoichi Sasaki and Choichi Asano, Hitachi-shi, Japan, assignors to Hitachi, Ltd., Tokyo, Japan
Continuation of application Ser. No. 435,878, Mar. 1, 1965. This application Nov. 29, 1968, Ser. No. 781,696
Claims priority, application Japan, Mar. 2, 1964, 39/11,328, 39/11,329
Int. Cl. C22c 39/14, 39/20
U.S. Cl. 148—37                                8 Claims

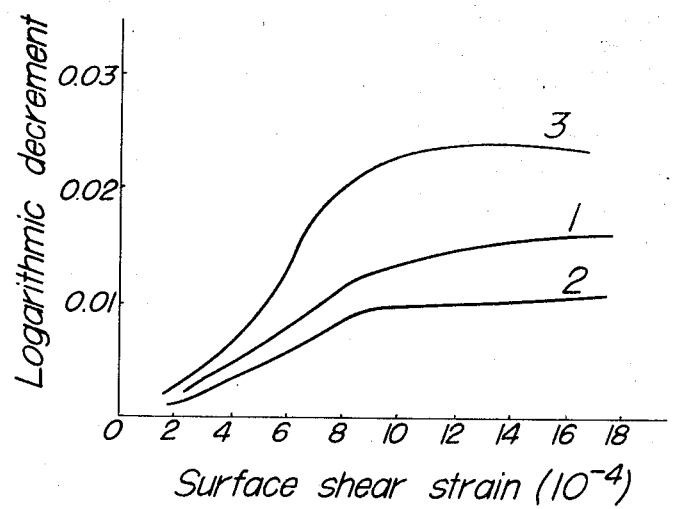

ABSTRACT OF THE DISCLOSURE

The present disclosure is directed to a low pressure stage, long turbine blade material of high tensile strength, high damping capacity and high ductility consisting essentially of about 0.2–0.5% of carbon, about 9.5–14% of chromium, about 0.3–2.5% of molybdenum, up to about 1.8% of at least one member selected from the group consisting of nickel and copper, about 0.03–2% of manganese and silicon, and the residual part composed of iron and its accompanying impurities.

---

This case is a continuation of application 435,878 filed Mar. 1, 1965, now abandoned.

The present invention relates to a turbine blade material which is of high tensile strength, high ductility and high damping capacity.

Since a steam turbine for thermoelectric generators recently tends to become of larger capacity and a low pressure turbine blade also becomes much longer, it is common now that a turbine blade is used in still more severe conditions than in the conventional cases.

Especially for a long blade of more than 30 inches, the tensile strength of the conventional blade materials is not enough, so a material of higher tensile strength is desirable. It is known that the vibration stress generated in a blade due to resonance is reversely proportional to the logarithmic decrement of the blade.

Therefore, a blade material of high tensile strength and high damping capacity is naturally desired.

The damping capacity is a capacity for damping the vibration of a blade by itself. In case of the turbine blade, this capacity depends upon various factors, especially the material factor itself, so that a material of large damping capacity in vibration should be employed.

The common material of a steam turbine blade is 12% Cr steel subjected to quenching and tempering. The tensile strength of this blade material, however, so small, i.e., 85400–114000 (p.s.i.). Although the tensile strength of this material can be increased by tempering at a low temperature, the damping capacity is lost and the impact value is lowered at the same time.

The first object of the present invention is to provide a metallic material suitable for the turbine blade of especially large size.

Further, the second object of the present invention is to provide a turbine blade material of high tensile strength.

The third object of the present invention is to provide a turbine blade material of high damping capacity and high ductility.

Other objects of the present invention will appear from the following detailed description of the invention.

The turbine blade material according to the present invention is composed of 0.2–0.5% of carbon, 9.5–14% of chromium, 0.3–2.5% of molybdenum, 0–1.8% of at least one member selected from the group consisting of nickel and copper, 0.03–2% in total of manganese and silicon, in weight, and the residual part composed of iron and its accompanying impurities.

Carbon is added for obtaining the high tensile strength and high damping capacity, and has the composition range of 0.2–0.5% in weight.

With less than 0.2% in weight of carbon, said properties are not sufficiently exhibited, while the impact value is lowered and the ductility is degenerated by adding more than 0.5% in weight of carbon.

The high tensile strength and the high damping capacity are attained with especially 0.21–0.28% in weight of carbon.

For increasing the ductility, 9.5–14% in weight of chromium are used. With less than 9.5% in weight of chromium, the damping capacity and the ductility are lowered while the damping capacity is lowered by adding more than 14% in weight of chromium.

By adding especially 11–13.5% in weight of chromium, a turbine blade material of high ductility and suitable damping capacity can be obtained.

Molybdenum is used for giving a material excellent ductility, high damping capacity and high tensile strength, and 0.3–2.5% in weight of molybdenum is effective.

Less than 0.3% in weight of molybdenum does not produce a sufficient effect, while, with more than 2.5% in weight of molybdenum, the effect is saturated and δ ferrite is apt to form, so that the blade characteristics are lowered.

The most desirable effect can be attained by using especially 0.6–1.3% in weight of molybdenum.

Manganese and silicon are the elements used as desulphurizing agent and deoxidizing agent, which effect can sufficiently be obtained with less than 1% in weight of said elements, respectively. The especially desirable effect can be attained with 0.5–1% in weight of manganese, 0.1–0.5% in weight of silicon, and less than 1.5% in weight of the sum of the two.

Nickel and copper are effective for improving the tempering resistance and hardenability of the material and for giving a higher tensile strength, which effect is displayed by using 0–1.8% in weight of nickel and copper.

Although the object of the present invention can be carried out without nickel and copper, said composition range preferably 0.5–1.5% in weight, of copper and nickel gives the most desirable effect.

Since a more excellent material is obtained by using nickel than by copper, it is desirable to use only nickel, especially by an amount of 0.5–1.5% in weight.

In a case that only copper is used according to circumstances, a desirable effect can be obtained by using 0.7–1.0% in weight of copper.

About 0.2% in weight of copper or nickel is usually contained as the impurities in steels, so the additional amount of copper and nickel should be determined by considering the amount of said contained nickel and copper.

The main components of the turbine blade material according to the present invention are said elements, which are accompanied with impurities, for example, phosphorous sulfur and nitrogen.

The material is not influenced badly as long as the impurities are controlled below 0.03% in weight, respectively.

The size of the tension test specimen was 8 mm. (0.315 in.) in diameter and the gauge length of 28 mm. (1.10 in.) was used, for measuring the elongation of said materials in the tension test. The impact value was obtained from the standard keyhole specimen by using the Charpy impact tester. The damping capacity of vibration was measured by using a Föpple type torsion vibration measuring tester.

Since the logarithmic decrement varies with the magnitude of strain amplitude as widely known, the logarithmic decrement was determined by the average value in the range of $12-16 \times 10^{-4}$ in the surface shear strain of the materials.

TABLE 1

| Specimen No. | Chemical composition | | | | | | | | | | Heat treating temperature (° C.) | | Tensile strength, p.s.i. | Elongation, percent | Reduction of area, percent | Impact value, ft.-lb. | Logarithmic decrement, δ |
|---|---|---|---|---|---|---|---|---|---|---|---|---|---|---|---|---|---|
| | C | Si | Mn | Cr | Mo | Ni | Cu | W | V | Cb | B | Oil quenching | Tempering | | | | | |
| 1 | 0.14 | 0.44 | 0.52 | 11.64 | | 0.04 | | | | | | 990 | 550 | 134,500 | 20 | 63 | 15 | 0.015 |
| 2 | 0.18 | 0.34 | 0.34 | 12.65 | | 0.97 | 0.75 | 0.82 | 0.33 | | | 1,000 | 620 | 134,000 | 20 | 58 | 12 | 0.010 |
| 3 | 0.18 | 0.39 | 0.71 | 11.29 | 0.80 | 0.15 | | | 0.16 | 0.20 | 0.035 | 1,150 | 700 | 132,500 | 12 | 47 | 8 | 0.010 |
| 4 | 0.26 | 0.36 | 0.59 | 12.31 | 0.52 | | | | | | | 990 | 650 | 134,700 | 20 | 58 | 24 | 0.023 |
| 5 | 0.26 | 0.36 | 0.59 | 12.31 | 0.52 | | | | | | | 990 | 600 | 141,800 | 18 | 54 | 21 | 0.019 |
| 6 | 0.27 | 0.46 | 0.53 | 11.79 | 1.11 | | | | | | | 990 | 650 | 138,700 | 20 | 58 | 28 | 0.020 |
| 7 | 0.27 | 0.31 | 0.46 | 12.12 | 2.30 | | | | | | | 990 | 650 | 140,600 | 19 | 56 | 25 | 0.017 |
| 8 | 0.27 | 0.54 | 0.70 | 9.0 | 0.90 | | | | | | | 990 | 650 | 127,000 | 25 | 44 | 25 | 0.012 |
| 9 | 0.26 | 0.36 | 0.51 | 12.12 | 1.23 | 1.04 | | | | | | 990 | 650 | 141,500 | 21 | 54 | 25 | 0.020 |
| 10 | 0.26 | 0.36 | 0.51 | 12.12 | 1.23 | 1.04 | | | | | | 990 | 700 | 133,000 | 20 | 56 | 28 | 0.024 |
| 11 | 0.23 | 0.48 | 0.63 | 11.13 | 0.91 | | 0.78 | | | | | 990 | 650 | 131,800 | 22 | 54 | 25 | 0.018 |
| 12 | 0.29 | 0.45 | 0.55 | 14.3 | 0.90 | | | | | | | 990 | 650 | 132,700 | 21 | 52 | 18 | 0.017 |
| 13 | 0.21 | 0.13 | 0.48 | 12.34 | 0.96 | 0.87 | 0.73 | | | | | 990 | 600 | 134,700 | 22 | 56 | 24 | 0.013 |

In above Table 1, the specimen Nos. 1, 2, 3, 7, 8, and 12 are samples shown to facilitate understanding of the present invention, while the rest gives the compositions and experimental results of the preferred materials according to the present invention.

As clearly shown in this table, the tensile strengths of almost the comparative samples are lower than those of the materials according to the present invention. The impact value and the logarithmic decrement of the comparative ones are also smaller than those in the present invention, so the comparative ones are not the most suitable as turbine blade materials.

The materials of the present invention have excellent properties generally and are suitable as the turbine blade.

In said examples as shown in the figure, 1 and 2 indicate the damping capacities of the conventional turbine blade materials while 3 is for that of the turbine blade material according to the present invention.

It is clearly shown from this figure that the turbine blade materials of the present invention have higher damping capacities and are suitable as the turbine blade.

What is claimed is:

1. A low pressure stage, long steam turbine blade material in a quenched and tempered state possessing a high tensile strength of at least 131,8000 p.s.i., an elongation of least 18%, a reduction of area of at least 54%, an impact value of at least 221 ft.-lbs. and a damping capacity of at least 0.18 logarithmic decrement (δ) consisting essentially of 0.2–0.5% of carbon, 9.5–14% of chromium, 0.6–1.3% of molybdenum, up to about 1.8% of at least one member selected from the group consisting of nickel and copper, 0.03–1% of manganese and 0.03–0.75% of silicon, in weight, and the residual part composed of iron and less than 0.03% of nitrogen, sulfur and phosphorus, respectively, as accompanying impurities.

2. A turbine blade material, according to claim 1, passessing a high tensile strength of at least 131,800 p.s.i., an elongation of at least 18%, a reduction of area of at least 54%, an impact value of at least 21 ft.-lbs. and a damping capacity of at least 0.018 logarithmic decrement (δ) which consists essentially of 0.2–0.5% of carbon, 9.5–14% of chromium, 0.6–1.3% of molybdenum, 0.5–1.5% of at least one member selected from the group consisting of nickel and copper, 0.03–2% of manganese and silicon, in weight, and the residual part composed of iron and less than 0.03% of nitrogen, sulfur and phosphorus, respectively as accompanying impurities.

3. A turbine blade material, according to claim 1, possessing a high tensile strength of at least 131,800 p.s.i., an elongation of at least 18%, a reduction of area of at least 54%, an impact value of at least 21 ft.-lbs. and a damping capacity of at least 0.018 logarithmic decrement (δ) which consists essentially of 0.2–0.5% of carbon, 9.5–14% of chromium, 0.6–1.3% of molybdenum, 0.5–1.5% of nickel, 0.03–2% of manganese and silicon, in weight, and the residual part composed of iron and less than 0.03% of nitrogen, sulfur and phosphorus, respectively as accompanying impurities.

4. A turbine blade material, according to claim 1, possessing a high tensile strength of at least 131,800 p.s.i., an elongation of at least 18%, a reduction of area of at least 54%, an impact value of at least 21 ft. lbs. and a damping capacity of at least 0.018 logarithmic decrement (δ) which consists essentially of 0.2–0.5% of carbon, 9.5–14% of chromium, 0.6–1.3% of molybdenum, 0.7–1.0% of copper, 0.03–2% of manganese and silicon, in weight, and the residual part composed of iron and less than 0.03% of nitrogen, sulfur and phosphous, respectively as accompanying impurities.

5. A turbine blade material, according to claim 1, possessing a high tensile strength of at least 131,800 p.s.i., an elongation of at least 18%, a reduction of area of at least 54%, an impact value of at least 21 ft. lbs. and a damping capacity of at least 0.018 logarithmic decrement (δ) which consists essentially of 0.2–0.5% of carbon, 9.5–14% of chromium, 0.6–1.3% of molybdenum, 0.5–1.5% of nickel, 0.7–1.0% of copper where the sum of nickel and copper is less than 1.5%, 0.03–2% of manganese and silicon, in weight, and the residual part composed of iron and less than 0.03% of nitrogen, sulfur and phosphorus, respectively as accompanying impurities.

6. A low pressure stage turbine blade material in a quenched and tempered state possessing a high tensile-strength of at least 131,800 p.s.i., an elongation of at least 18%, a reduction of area of at least 54%, an impact value of at least 21 ft. lbs. and a damping capacity of at least 0.018 logarithmic decrement (δ) which consists essentially of 0.21–0.28% of carbon, 11–13.5% of chromium, 0.6–1.3% of molybdenum, 0.5–1.5% of nickel, 0.5–1.5% of the sum of manganese and silicon and less than 0.1% of the impurities.

7. A low pressure stage steam turbine blade material in a quenched and tempered state possessing a high tensile strength of at least 131,800 p.s.i., a high damping capacity of at least 0.018 logarithmic decrement (δ) an elongation of at least 18%, a reduction of area of at least 54%, and an impact value of at least 21 ft. lbs. which consists essentially of 0.2–0.5% of carbon, 9.5–14% of chromium, 0.6–1.3% of molybdenum, 0.–1.8% of at least one member selected from the group consisting of nickel and copper, 0.03–2% of manganese and silicon, in weight, and the residual part composed of iron and its accompanying impurities.

8. A low pressure stage, steam turbine blade in a quenched and tempered state possessing a high tensile strength of at least 131,800 p.s.i., an elongation of at least 18%, a reduction of area of at least 54%, an impact value of at least 21 ft. lbs. and a damping capacity of at least 0.018 logarithmic decrement (δ) which consists essentially of 0.2–0.5% of carbon, 9.5–14% of chromium, 0.6–1.3% of molybdenum, up to about 1.8% of at least one member selected from the group consisting of nickel and copper, 0.03–2% of manganese and silicon, in weight, and the residual part composed of iron and less than 0.03% of nitrogen, sulfur and phosphorus, respectively as accompanying impurities.

References Cited

UNITED STATES PATENTS

| | | | |
|---|---|---|---|
| 2,590,835 | 4/1952 | Kirkby | 75—126 |
| 2,227,891 | 1/1941 | Rose | 75—128 |
| 2,382,273 | 8/1945 | Thielemann | 75—125 |
| 2,513,935 | 7/1950 | Harris | 75—126 |
| 2,816,830 | 12/1957 | Kegerise | 75—125 |
| 3,170,112 | 2/1965 | Bungardt | 75—126 X |
| 3,149,965 | 9/1964 | Jennings | 75—128.5 |
| 1,630,448 | 5/1927 | Oertel | 75—128.9 |
| 1,956,645 | 5/1934 | Langenberg | 75—126 C |
| 2,316,488 | 4/1943 | Roth | 75—128.9 |
| 2,648,602 | 8/1953 | Payson | 75—126 C |
| 2,895,861 | 7/1959 | Bastien | 75—126 C |
| 3,069,257 | 12/1962 | Clarke | 75—126 C |
| 2,905,577 | 9/1959 | Harris | 75—126 C |

HYLAND BIZOT, Primary Examiner

U.S. Cl. X.R.

75—128 W, 125